US006945264B1

(12) United States Patent
Denzel et al.

(10) Patent No.: US 6,945,264 B1
(45) Date of Patent: Sep. 20, 2005

(54) FLOW CONTROL VALVE AND METHOD FOR USING THE SAME

(75) Inventors: William E. Denzel, Atascadero, CA (US); Clark Behnke, Paso Robles, CA (US); Hany Armia Said, Arcadia, CA (US)

(73) Assignee: Zurn Industries, Inc., Erie, PA (US)

( * ) Notice: Subject to any disclaimer, the term of this patent is extended or adjusted under 35 U.S.C. 154(b) by 0 days.

(21) Appl. No.: 10/887,606

(22) Filed: Jul. 9, 2004

(51) Int. Cl.[7] ........................... F16K 3/08; F16K 15/18

(52) U.S. Cl. .................. 137/1; 137/614.2; 137/625.31; 137/613; 137/454.6

(58) Field of Search ........................ 137/614.2, 625.31, 137/454.5, 454.6, 1, 613

(56) References Cited

U.S. PATENT DOCUMENTS

| | | | | |
|---|---|---|---|---|
| 2,889,852 | A | | 6/1959 | Dunlap |
| 3,414,007 | A | | 12/1968 | De Marco |
| 4,360,040 | A | | 11/1982 | Cove et al. |
| 4,431,028 | A | | 2/1984 | Hendrick |
| 4,506,991 | A | | 3/1985 | Hudson |
| 4,532,961 | A | | 8/1985 | Walton et al. |
| 4,944,330 | A | * | 7/1990 | Sakakibara et al. ...... 137/454.2 |
| 4,946,134 | A | | 8/1990 | Orlandi |
| 5,076,308 | A | | 12/1991 | Cohen |
| 5,131,170 | A | | 7/1992 | Rilke |
| 5,308,040 | A | | 5/1994 | Torres |
| 5,392,805 | A | * | 2/1995 | Chrysler ................ 137/625.31 |
| 5,402,821 | A | | 4/1995 | Harstad |
| 5,417,083 | A | | 5/1995 | Eber |
| 5,699,941 | A | | 12/1997 | Johnson et al. |
| 5,996,614 | A | * | 12/1999 | Ashton .................... 137/614.2 |
| 6,192,922 | B1 | | 2/2001 | MacGibbon et al. |
| 6,196,417 | B1 | | 3/2001 | Johnson et al. |
| 6,273,141 | B1 | | 8/2001 | DeSellem |
| 6,416,032 | B2 | | 7/2002 | Oh |
| 2001/0042851 | A1 | | 11/2001 | Oh |
| 2003/0160199 | A1 | | 8/2003 | Bareis et al. |

FOREIGN PATENT DOCUMENTS

| | | |
|---|---|---|
| DE | 3421653 | 9/1985 |
| DE | 3821351 | 12/1989 |
| GB | 1365544 | 9/1984 |

* cited by examiner

*Primary Examiner*—Kevin Lee
(74) *Attorney, Agent, or Firm*—The Webb Law Firm

(57) ABSTRACT

A flow control module has a valve body with a bore extending therethrough and a first disc occupying substantially the entire area of the bore and having at least one aperture extending therethrough. The valve body also includes a second disc adjacent to the first disc wherein the second disc also occupies substantially the entire area of the bore and has at least one aperture extending therethrough. The discs are rotated so that the apertures may align to increase or to reduce flow therethrough. The valve body also includes a check valve proximate to the first disc and the second disc to close and prevent backflow. Arranging multiple flow control modules in line in a system provides incremental pressure drops to achieve a total pressure drop in stages while minimizing or eliminating cavitation.

26 Claims, 9 Drawing Sheets

FLOW CONTROL VALVE AND METHOD FOR USING THE SAME

BACKGROUND OF THE INVENTION

1. Field of the Invention

The invention is directed to a variable flow control valve having a check valve attached thereto and a method for using the same.

2. Description of the Related Art

During the operation of a municipal reverse osmosis water purification plant, a concentrate control valve (CCV) is utilized to control the pressure and flow rate of unpurified water through a reverse osmosis membrane. This reverse osmosis system is generally built using large blocks of membrane filters called trains. Multiple trains are connected in parallel to achieve the required capacity. Each train may have a capacity ranging from less than a hundred thousand gallons per day to more than one million gallons per day. The trend has been to increase the capacity of each individual train rather than to build higher volumes of trains to meet increasing capacity requirements. Each train requires one concentrate control valve. These concentrate control valves are required to operate in three modes, including 1. An operating mode in which the valve should create a pressure drop capable of being modulated at varying flow rates.
2. Start up and flushing modes wherein the valve should create a minimum pressure drop.
3. A shut down mode in which the valve must shut drip tight.

Currently there are three concentrate control valve designs being utilized. A globe style control valve which is intentionally oversized to meet the minimum pressure drop requirements and during normal operation, the globe valve operates toward the lower end of its travel to create the required pressure drop, but this produces cavitation. Cavitation in a valve creates excessive wear and noise. A special anti-cavitation globe is available, however the price is excessive. As a second option a v-port control ball valve may be used and is preferred over the globe style control valve. Additionally, an actuated butterfly valve may be substituted for the v-port ball valve and either valve may be utilized in conjunction with an orifice plate to limit the pressure drop across the valve to eliminate cavitation. However, during start up and flushing, when using a v-port control valve or a butterfly valve, the minimum pressure drop is increased due to the presence of the orifice plate.

A design is required for a control valve that is relatively inexpensive and provides for variable flow and variable pressure drops past the valve without cavitation but at the same time incorporates a check valve to close the valve and prevent backflow.

SUMMARY OF THE INVENTION

In one embodiment, a flow control valve module is comprised of a valve body, a first disc, a second disc and a check valve. The valve body has a bore extending therethrough, wherein the bore has an area. The first disc is secured within the valve body and occupies substantially the entire area of the bore. At least one aperture extends through the disc. The second disc is adjacent to the first disc within the valve body and i) occupies substantially the entire area of the bore, ii) is rotatable within the valve body about a central shaft, iii) has at least one aperture extending through the second disc, and iv) is rotatable to align the apertures of each disc an amount necessary to control fluid flow. The alignment always provides at least some fluid flow between the first disc and the second disc. The check valve is within the valve body proximate to the first disc and second disc to close and prevent backflow.

In a second embodiment, a flow control valve system is comprised of plurality of flow control modules arranged in line with one another. Each module is comprised of a valve body, a first disc, a second disc and a check valve. The valve body has a bore extending therethrough, wherein the bore has an area. The first disc is secured within the valve body and i) occupies substantially the entire area of the bore and ii) has at least one aperture extending through the disc. The second disc is adjacent to the first disc within the valve body and i) occupies substantially the entire area of the bore, ii) is rotatable within the valve body about a central shaft, iii) has at least one aperture extending through the second disc, and iv) is rotatable to align the apertures of each disc an amount necessary to control fluid flow. The check valve is within the valve body proximate to the first disc and second disc to close and prevent back flow.

In yet another embodiment, a method of controlling flow within a pipeline having a flow area therein comprises the steps of a) installing a check valve within the pipeline, b) installing a flow control valve module within the pipeline adjacent to and upstream of the check valve, wherein the flow control valve module has two abutting discs with apertures extending therethrough and wherein each disc occupies substantially the entire flow area; and c) aligning the apertures of the first disc and the second disc to provide a flow through the discs within the range of maximum flow with minimum pressure drop and minimum flow with maximum pressure drop.

DETAILED DESCRIPTION OF THE INVENTION

Figure 1:
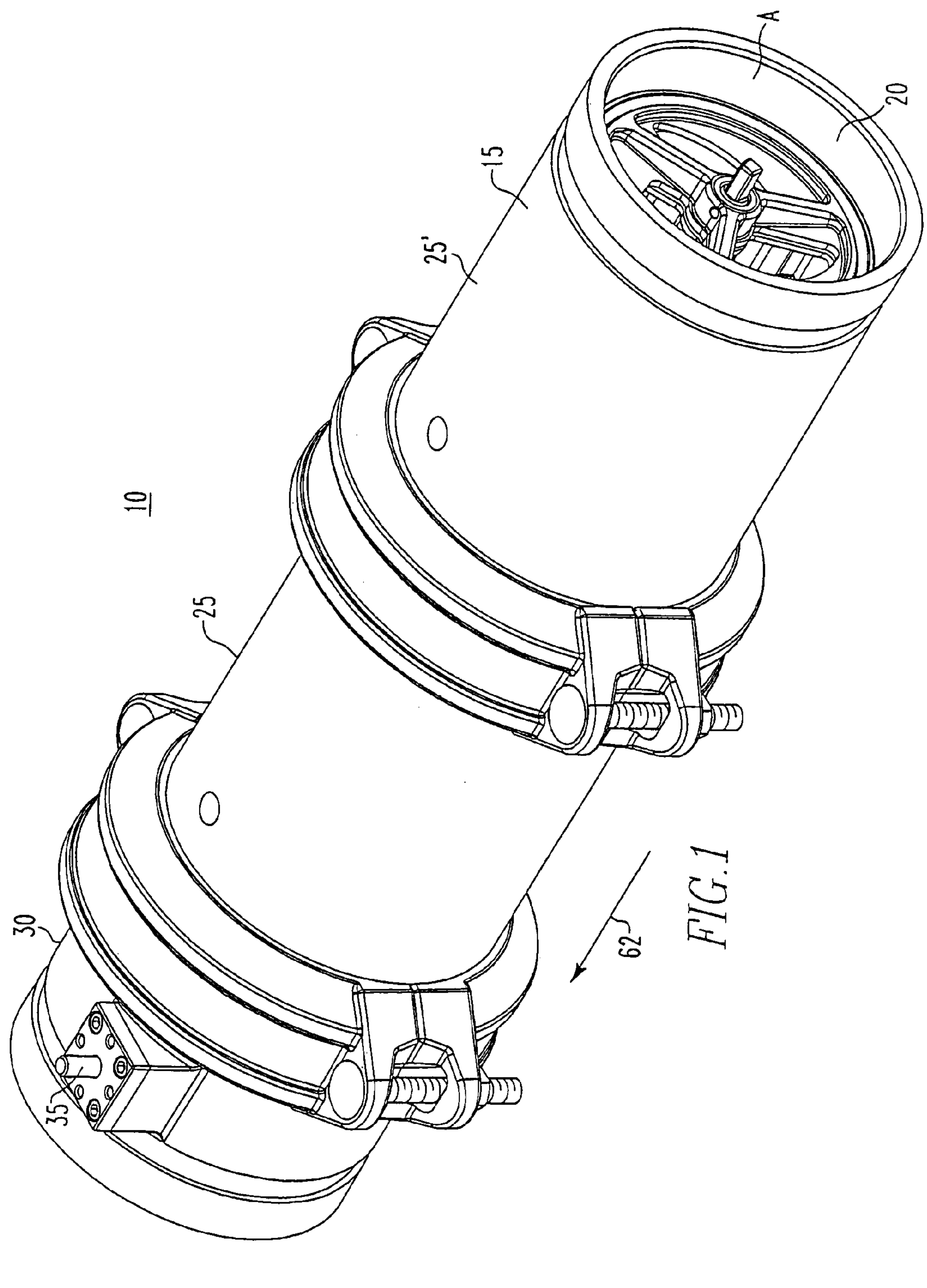
FIG. 1 is a perspective view of a flow control system containing at least one flow control module in accordance with the subject invention.

FIG. 1 illustrates a flow control system 10 made up of at least one flow control module 25 and a driver 30 operated by stem 35 to operate the flow control module 25. FIG. 1 illustrates two control modules 25, 25' and the driver 30 controls each of these.

Figure 2:
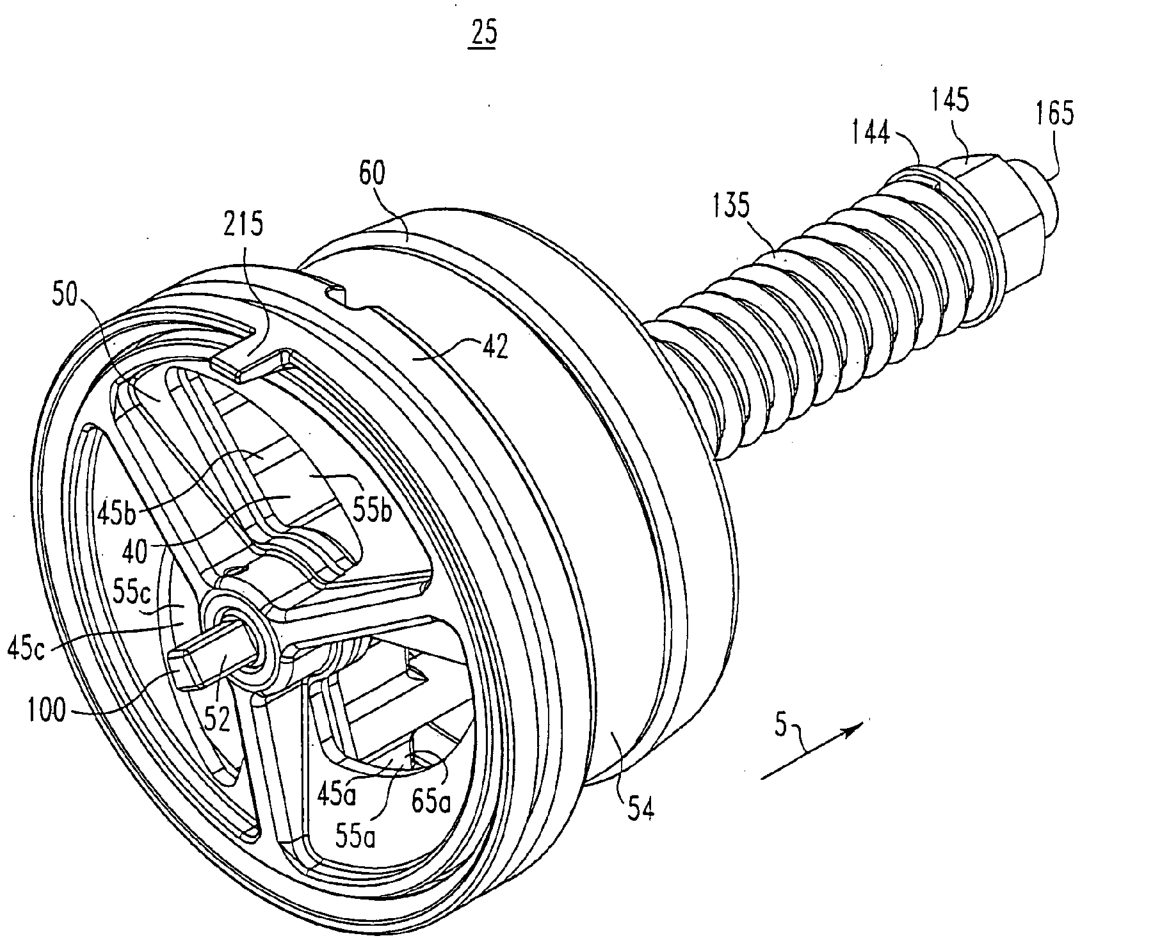
FIG. 2 is a perspective view of a flow control module.

A typical flow control module 25 is comprised of a valve body 15 (FIG. 1) having a bore 20 extending therethrough wherein the bore 20 has an area A. Directing attention to FIGS. 2 and 3, a first disc 40 is secured within the valve body 15 and occupies substantially the entire area A of the bore 20. The first disc 40 also has at least one aperture 45*a* extending through the first disc 40. As illustrated in FIG. 2 there are three apertures 45*a*, 45*b* and 45*c* extending through the first disc 40.

Figure 3:
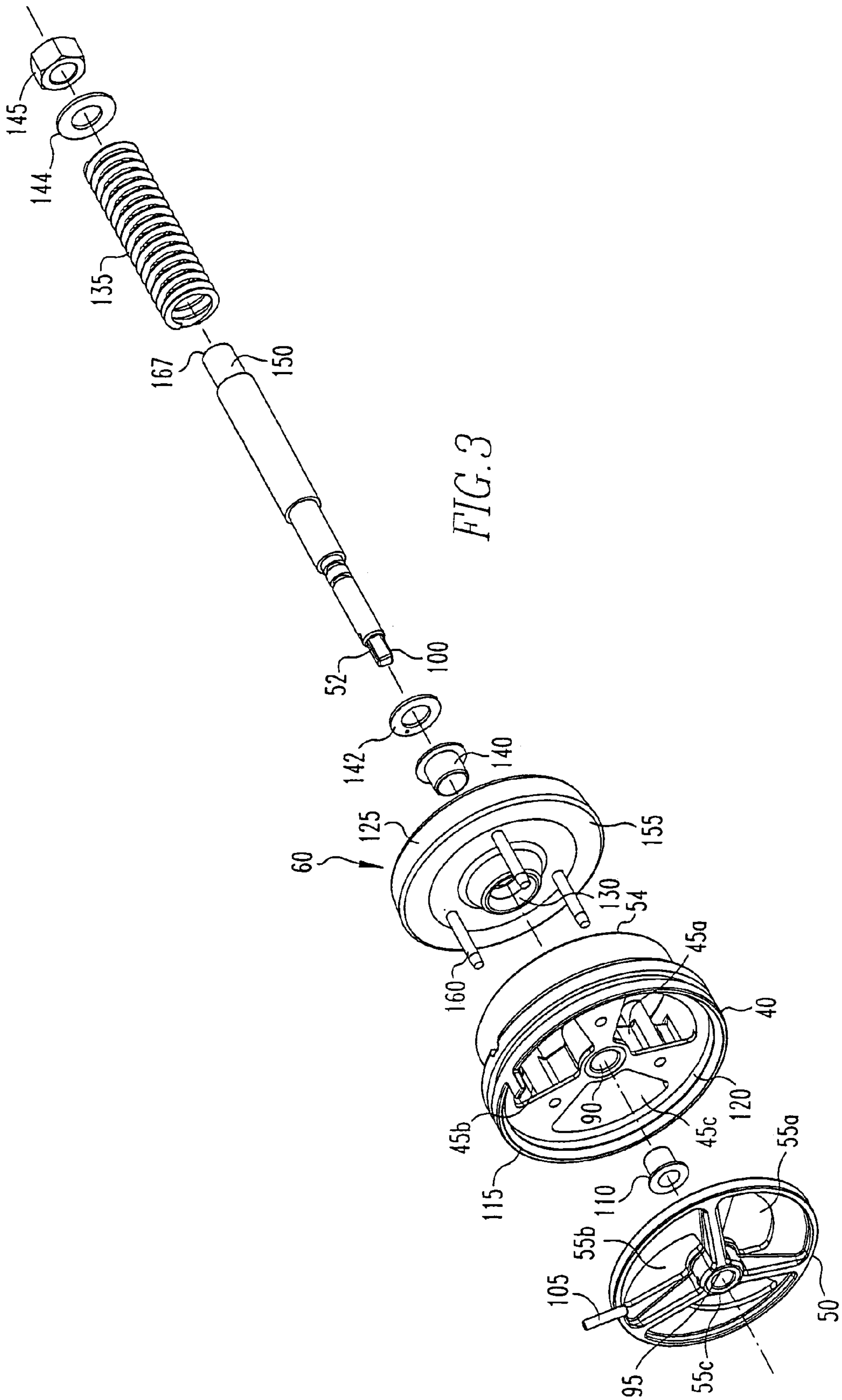
FIG. 3 is an exploded view of the flow control module illustrated in FIG. 2.
Figure 4:
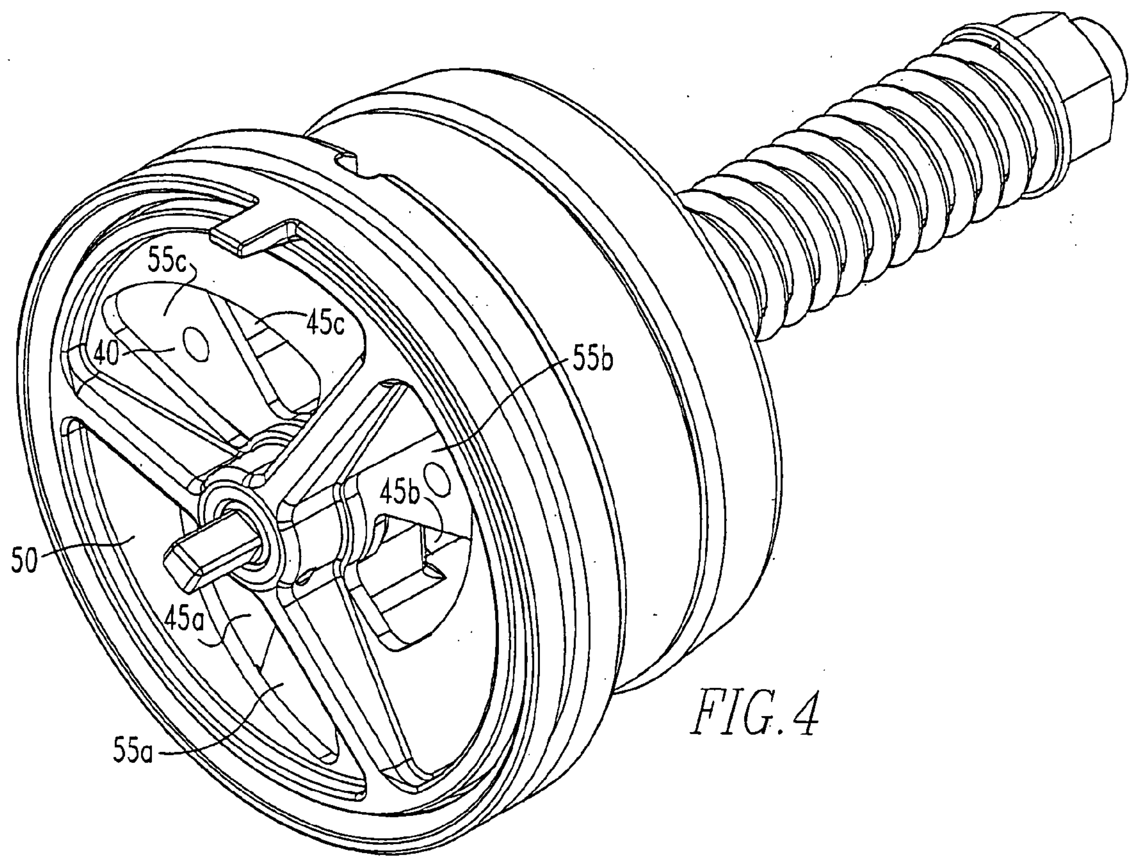
FIG. 4 is a detail of the flow control module showing the relationships between the discs.

A second disc 50 is positioned adjacent to the first disc 40 within the valve body 15. The second disc 50 also occupies substantially the entire area A of the bore 20. Furthermore the second disc 50 is rotatable within the valve body 15 (FIG. 1) about a central shaft 52. The second disc 50 has at least one aperture 55*a* extending through the second disc 50. As illustrated, the second disc 50 has three apertures 55*a*, 55*b*, and 55*c* extending therethrough. It should be noted that in FIG. 2 the apertures 45*a*, 45*b*, 45*c* of the first disc 40 are aligned with the apertures 55*a*, 55*b*, and 55*c* of the second disc 50. FIG. 3 illustrates the apertures more clearly. The second disc 50 is rotatable about the central shaft 52 to align the apertures 55*a*, 55*b*, 55*c* of the second disc 50 with the apertures 45*a*, 45*b*, 45*c* of the first disc 40 in an amount necessary to control flow. The size and shape of the apertures 45*a*, 45*b*, 45*c* and 50*a*, 50*b*, 50*c* are designed such that at least some fluid flow between the first disc 40 and the second disc 50 is ensured. FIG. 4 shows the second disc 50 rotated relative to the first disc 40 so that the apertures 45*a*, 45*b*, 45*c* of the first disc 40 are not fully aligned with the apertures 55*a*, 55*b*, 55*c* of the second disc 50.

Additionally a check valve 60 is positioned within the valve body 15 proximate to the first disc 40 and the second disc 50 to close the valve and to prevent backflow. Briefly referring to FIG. 1, the flow of fluid within the system 10 is intended to be along arrow 62. The discs 40, 50 move relative to one another to define aperture pair passageways 70*a*, 70*b*, 70*c* (FIG. 5).

As illustrated in FIGS. 2 and 3 the central shaft 52 extends through the second disc 50 and engages the second disc 50.

Figure 5:
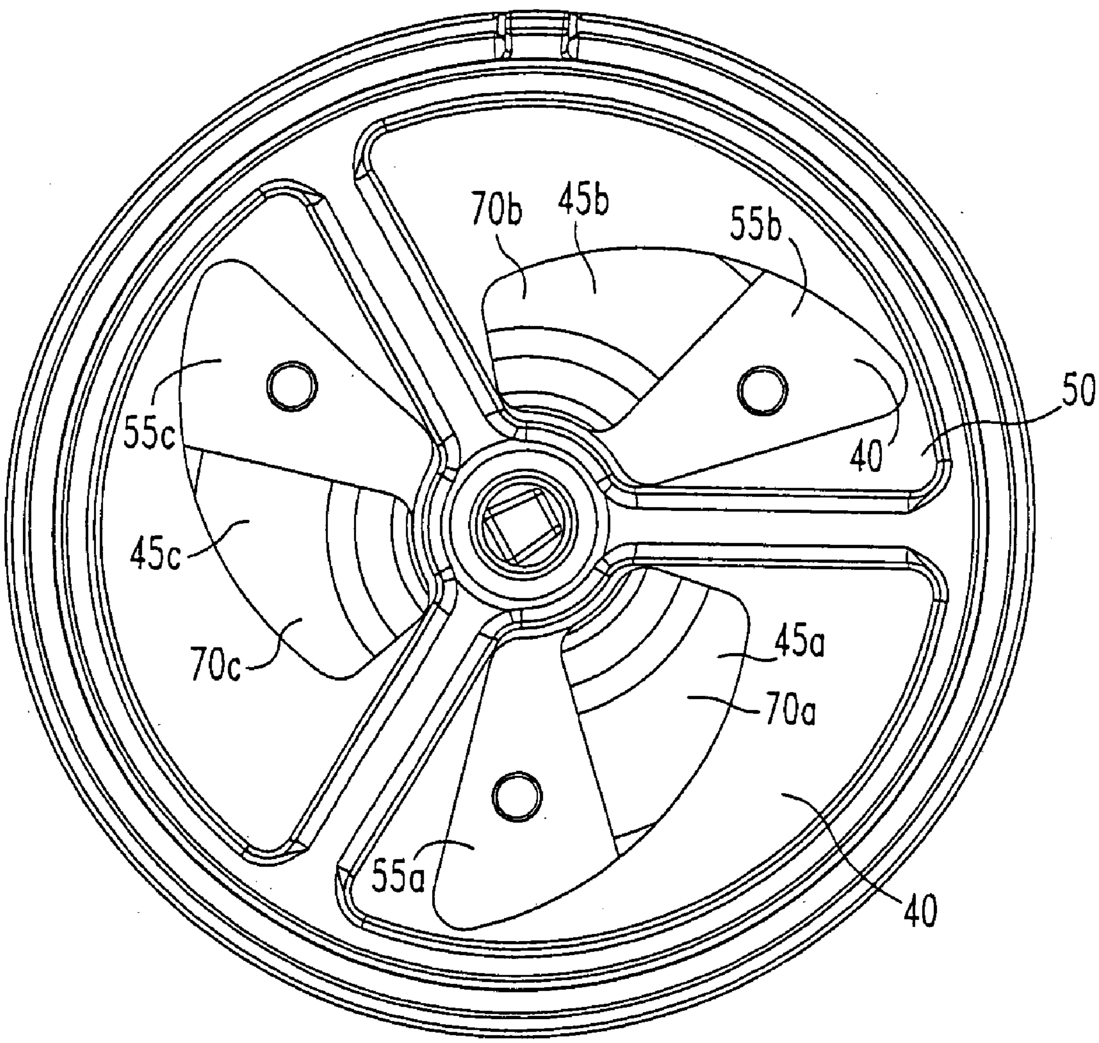
FIG. 5 is a view of the flow control module illustrated in FIG. 2 in the direction illustrated by arrow 5 wherein the discs are arranged for minimum flow.
Figure 6:
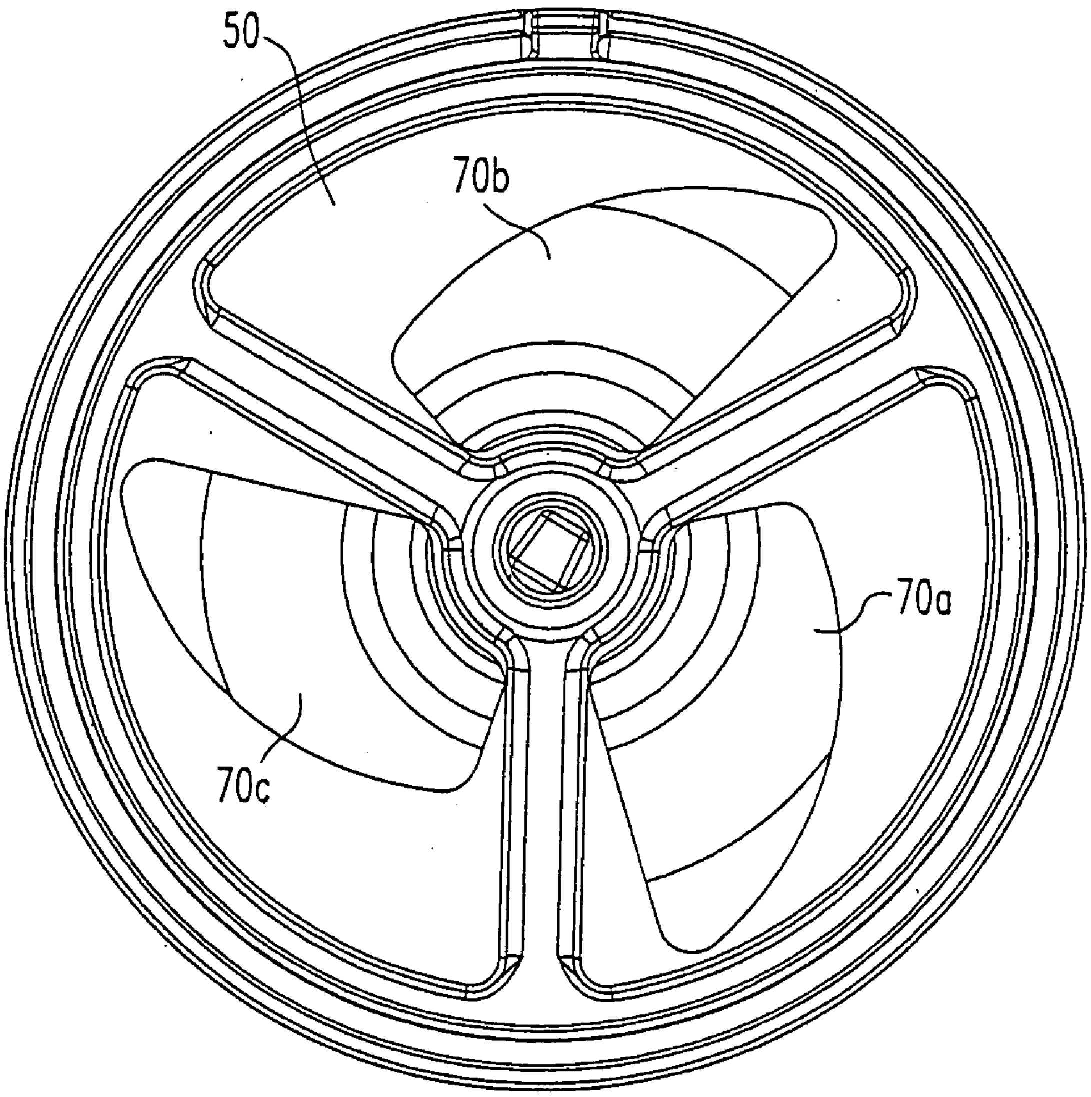
FIG. 6 is a view of the flow control module illustrated in FIG. 2 in the direction illustrated by arrow 5 wherein the discs are arranged for maximum flow.

FIG. 5 and FIG. 6 illustrate the aperture pair passageways 70*a*, 70*b*, 70*c* wherein in FIG. 5 the second disc 50 is rotated relative to the first disc 40 so that the area of the aperture pair passageways 70*a*, 70*b*, 70*c* is minimized. Under these circumstances, the pressure drop past the first disc 40 and the second disc 50 is maximized and the flow is minimized. The apertures 45*a*, 45*b*, 45*c* of the first disc 40 and 55*a*, 55*b*, 55*c* of the second disc 50 are shaped so that the area of the aperture pair passageways 70*a*, 70*b*, 70*c* changes in a linear fashion as the area of the aperture pair passageways 70*a*, 70*b*, 70*c* increases or decreases.

On the other hand, as illustrated in FIG. 6, the second disc 50 may be rotated relative to the first disc 40 (not shown) so that the area of the aperture pair passageways 70*a*, 70*b*, 70*c* is maximized and the pressure drop there across is minimized. By rotating the second disc 50 relative to the first disc 40, the aperture pair passageways 70*a*, 70*b*, 70*c* may be adjusted to provide variable areas within each passageway which then provides a desired flow and pressure drop.

Figure 7:
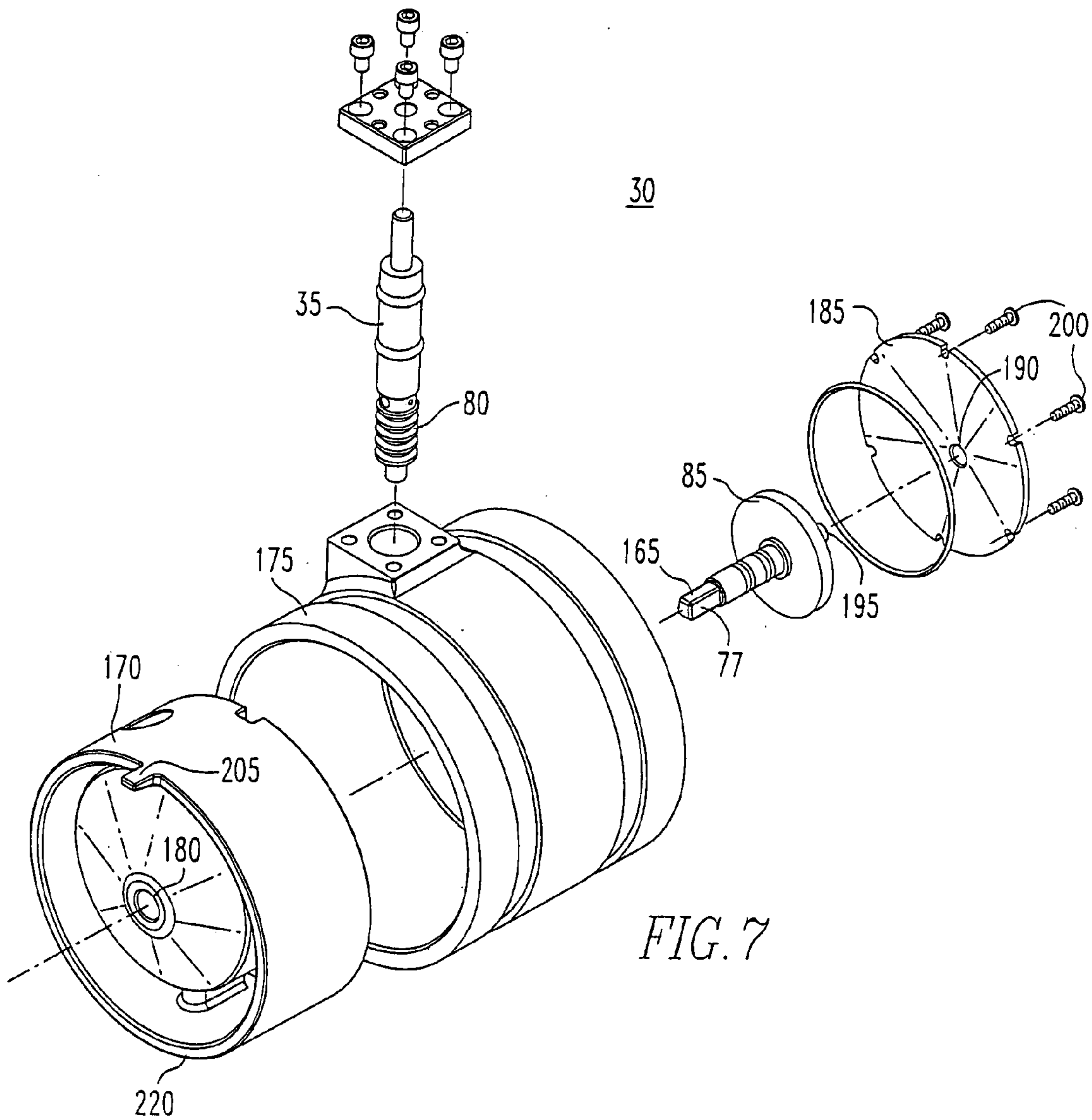
FIG. 7 is an exploded view of a driver used to position the moveable disc of a flow control module.

FIG. 2 illustrates the second disc 50 of each flow control valve module 25 is controlled by the rotation of the central shaft 52. FIG. 7 illustrates a driver 30 which is mounted within the inner bore 20 (FIG. 1) of the valve body 15 for rotating the central shaft 52 and thereby rotating the second disc 50 to a desired rotational position. In particular, the driver 30 is comprised of a gear arrangement whereby a worm gear driver 80 engages a driven gear 85, which is mounted upon a drive shaft 77 which is co-axial with the central shaft 52. The gear ration R between the worm gear driver 80 and the driven gear 85 is greater than 1.

Returning attention to FIGS. 2 and 3, the flow control module 25 is mounted within the valve body 15 (FIG. 1) by securing the outer perimeter of the first disc 40 against the inner bore 20 of the valve body 15. As a result, the first disc 40 does not rotate but is relatively fixed within the valve body 15. The central shaft 52 extends through a bore 90 within the first disc 40 and into a bore 95 within the second disc 50. The shaft 52 freely rotates within the bore 90 in the first disc 40, however, is non-rotatably secured within the bore 95 in the second disc 50 such that rotation of the central shaft 52 results in rotation of the second disc 50. As illustrated in FIG. 2 the central shaft 52 has a square end 100 and the shape of the bore 95 in disc 50 is square-shaped to accept the square end 100 of the central shaft 52. A set screw 105 may be used to secure the square end 100 of the central shaft 52 within the bore 95 of the second disc 50. In the alternative, the end 100 of the central shaft 52 may be circular in so long as a set screw 105 or mechanical lock is used to secure the second disc 50 to the central shaft 52 prevents relative rotation between the two parts.

A bushing 110 may be positioned within the bore 90 of the first disc 40 to permit free rotation of the central shaft 52 within the bore 90. Additionally, the first disc 40 may have a lip 115 protruding about its circumference so that the second disc 50 may be positioned within a recess 120 created by the lip 115.

The check valve 60 is comprised of a check valve pressure plate 125 that seals on the downstream edge 54 of the second disc 50. The central shaft 52 extends through the bore 130 in the pressure plate 125 so that the pressure plate 125 may move freely along the central shaft 52. However, the pressure plate 125 is urged into the closed position by a spring 135 mounted about the central shaft 52 and urged against the pressure plate 125. In particular, a bushing 140 fits within the bore 130 of the pressure plate 125 and the spring 135 is secured between two washers 142, 144, by a nut 145 which is secured to a threaded end 150 of the central shaft 52. As a result, the check valve 60 has a pre-load which is a function of the compression force exerted by the spring 135. FIG. 2 shows an assembled view of the exploded view in FIG. 3.

A flexible seal 155 is positioned on the upstream side of the pressure plate 125 to adequately locate against the first disc 40 to form a seal. Guide pins 160 may be used between the first disc 40 and the pressure plate 125 to prevent rotation of the pressure plate 125.

As previously mentioned, the flow control module 25 is mounted within the valve body 15 and the central shaft 52 is rotated such that the rotational position between the first disc 40 and the second disc 50 may be adjusted to adjust the areas of the aperture pair passageways 70*a*, 70*b*, 70*c*. The central shaft 52 of the flow control module 25 is rotated by the drive shaft 77 of the driver 30. The driver 30 is coupled to a valve body 15 of the module 25. In particular, directing attention to FIG. 7, the drive shaft 77 may have a square end 165 which engages a matching recess 167 within the end 150 (FIG. 3) of the central shaft 52. A support disc 170 is secured within the driver body 175 and the drive shaft 77 extends through a bore 180 within the support disc 170. In its assembled state the square end 165 of the drive shaft 77 protrudes beyond the bore 180 within the support disc 170 such that the driver body 175 and the flow control module 25 may be placed adjacent one another within the valve body 15 and the square rod 165 of the drive shaft 77 may engage the square recess 167 within the end 150 of the central shaft 52. By doing so, rotation of the stem 35 causes the drive shaft 77 to rotate which in turn causes the central shaft 52 to rotate thereby changing the relative rotational position of second disc 50 relative to the first disc 40 and altering the area of each of the aperture pair passageways 70*a*, 70*b*, 70*c*.

The drive shaft 77 is secured within the driver body 175 by being guided within the bore 180 of the support disc 170 at one end and furthermore being guided by a plate 185 having a support bore 190 which accepts the opposing end 195 of the drive shaft 77. The support plate 185 is secured to the support disc 170 using fasteners 200 between the plate 185 and the support disc 170.

Figure 8:
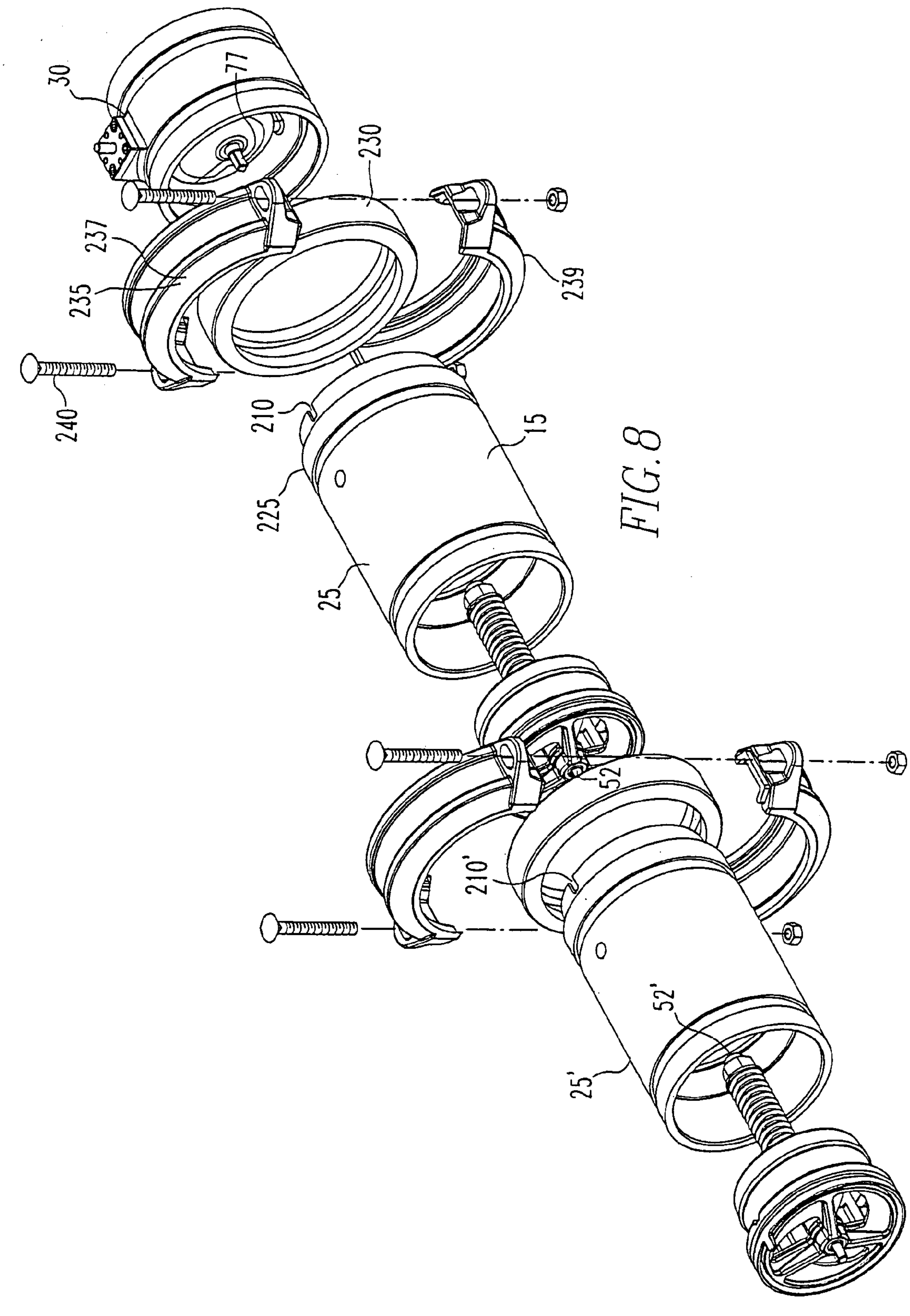
FIG. 8 is an exploded view of a flow control valve system utilizing multiple flow control valve modules.

Directing attention to FIG. 2 it should be noted that the central shaft 52 of the flow control module 25 extends beyond the second disc 50. The end 100 of the central shaft 52 may have a shape identical to that of the end 165 of the driveshaft 77. In this manner, it is possible to assemble a flow control valve system as illustrated in FIG. 8 comprising a plurality of flow control modules 25 arranged in line with one another wherein each flow control module 25 is identical to one another. As seen in FIG. 8 the central shaft 52 of flow control module 25 engages the central shaft 52' of the adjacent flow control module 25'. Furthermore, the central shaft 52 of the flow control module 25 is engaged by the drive shaft 77 of the driver 75. To properly align flow control module 25 with the driver 75, the driver 75 includes an alignment tab 205 (FIG. 7) which engages an alignment recess 210 (FIG. 8) within the valve body 15 of the flow control module 25. Additionally, the valve body 15 of the flow control module 25 includes an alignment tab 215 (FIG. 2) which may be used to engage the alignment recess 210' of another flow control module 25' as illustrated in FIG. 8. The end 220 (FIG. 7) of the driver 75 is compatible with the end 225 (FIG. 8) of the flow control module 25 such that a sealing ring 230 may overlap each end 220, 225 and be secured against each of these ends 220, 225 using a locking ring 235 comprised of a first half 237 and a second half 239 secured to one another using fasteners 240.

Figure 9:
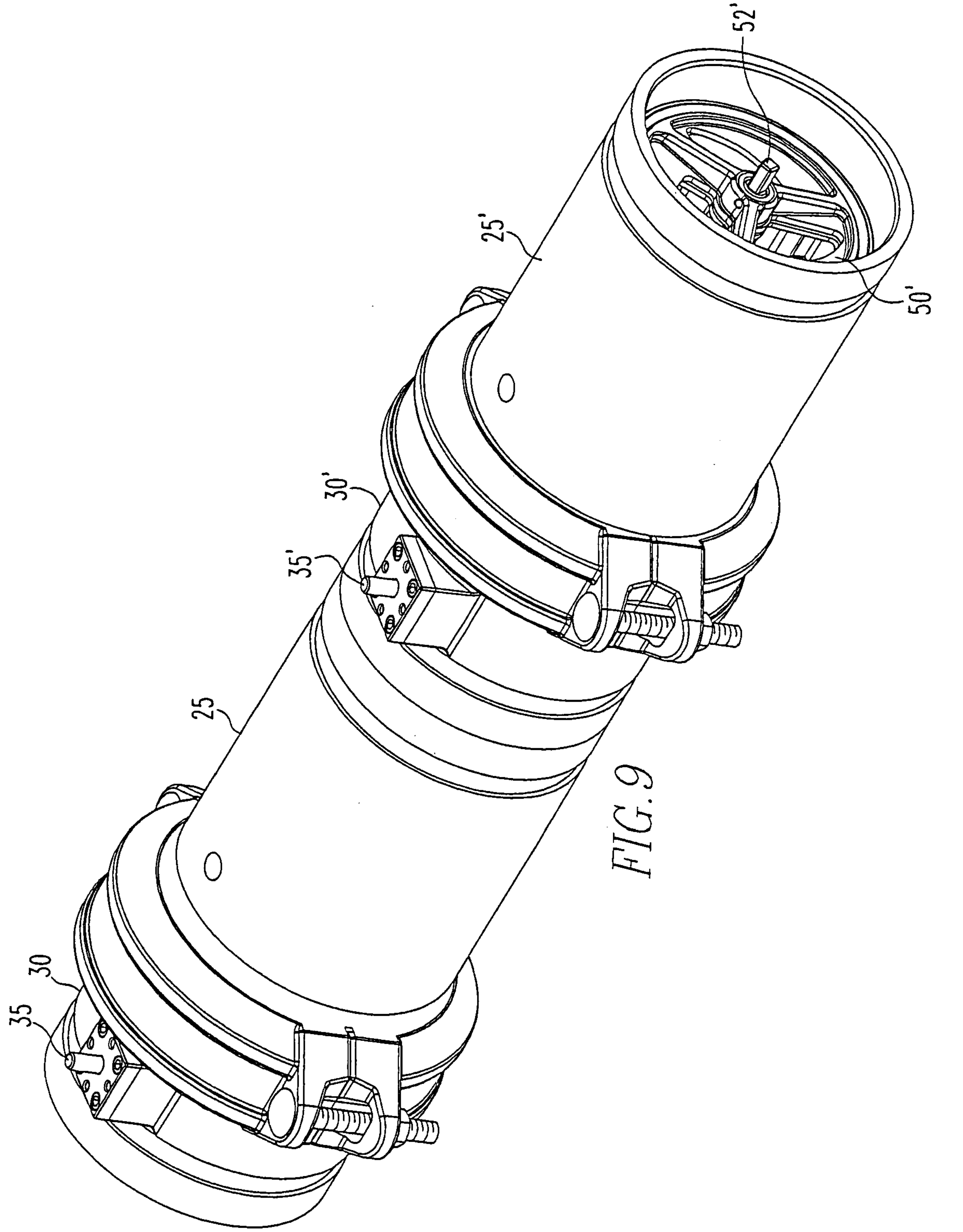
FIG. 9 is an isometric view of a flow control valve system with a driver associated with each flow control module.

Utilizing this design it is possible to include a plurality of flow control modules 25, 25' operated by a single driver 30 within a single valve body 15 to provide a flow control system. By utilizing multiple flow control modules 25, 25' it is possible to reduce pressure from the inlet to the outlet of a flow control system through a plurality of incremental pressure drops thus eliminating cavitation. Further, as illustrated in FIG. 9, it is possible to include multiple drivers 30, 30' to individually control the relative rotation of flow control modules 25, 25' independently. In this case the drive shaft 77 (FIG. 7) of driver 30 engages the recess 165 (FIG. 2) in the rear of the central shaft 52, thus rotating the second disc 50 of the flow control module 25. Additionally, a second driver 30' engages the recess (not shown) in the rear of the central shaft 52', thus rotating the second disc 50' of the flow control module 25' independently of the first flow control module 25. By utilizing multiple drivers in such a fashion the pressure drop across each stage can be optimized to create maximum pressure drop in each stage while avoiding cavitation.

This design may be utilized to control flow within a pipeline wherein the pipeline has a flow area by installing a check valve 60 within a pipeline and installing at least one flow control module 25 within the valve body 15 adjacent to and upstream of the check valve 60. The flow control module 25 has two abutting discs 40, 50 with apertures 45*a*, 45*b*, 45*c* and 55*a*, 55*b*, 55*c* extending therethrough. Each disc 40, 50 occupies substantially the entire flow area of the valve body 15. The apertures 45*a*, 45*b*, 45*c* of the first disc 40 and the apertures of the second disc 50; 55*a*, 55*b*, 55*c*, may be aligned to provide a flow past the discs 40, 50 within the range of maximum flow with minimum pressure drop and minimum flow with maximum pressure drop.

The valve body 15 may be produced from commercially available piping and may be made from metal or plastic. As a result, the costs associated with the fabrication of the flow control module 25 or the driver 75 may be reduced.

This invention has been described with reference to the preferred embodiments. Obvious modifications and alterations will occur to others upon reading and understanding the preceding detailed description. It is intended that the invention be construed as including all such modifications and alterations.

What is claimed is:

1. A flow control valve module comprised of:

a) a valve body having a bore extending therethrough, wherein the bore has an area;

b) a first disc secured within the valve body, wherein the first disc
   i) occupies substantially the entire area of the bore and
   ii) has at least one aperture extending through the disc;

c) a second disc adjacent to the first disc within the valve body, wherein the second disc
   i) occupies substantially the entire area of the bore,
   ii) is rotatable within the valve body about a central shaft,
   iii) has at least one aperture extending through the second disc, and
   iv) is rotatable to align the apertures of each disc an amount necessary to control fluid flow, and whereby the alignment always provides at least some fluid flow between the first disc and the second disc;

d) a check valve within the valve body proximate to the first disc and second disc to close and prevent back flow; and e) wherein the check valve has a valve seating surface on the downstream face of the first disc and wherein the check valve is downstream of the first disc.

2. The module in accordance with claim 1, wherein the at least one aperture of the first disc has an associated at least one aperture in the second disc to define aperture pairs between the first disc and the second disc and wherein the discs of each aperture pair move relative to one another to define aperture pair passageways.

3. The module in accordance with claim 1, wherein the central shaft extends through the second disc and is engaged with the second disc and further includes a driver for rotating the central shaft and thereby second disc to a desired rotational position.

4. The module in accordance with claim 3, wherein the driver is comprised of a gear arrangement.

5. The module according to claim 4, wherein the gear arrangement is a worm gear driver, which engages a driven gear, mounted upon the central shaft.

6. The module according to claim 5, wherein the gear ratio between the worm gear driver and the driven gear is greater than 1:1.

7. The module according to claim 1, wherein the apertures are shaped so that the area of the orifice passageway changes linearly as the second disc is rotated relative to the first disc.

8. The module according to claim 1, wherein when aligned for maximum flow, the aperture pairs produce a minimal pressure drop and when aligned for minimum flow, the aperture pairs produce a maximum pressure drop.

9. The module according to claim 1, wherein the valve body is made of one from the group consisting of metal and plastic.

10. The module in accordance with claim 1, wherein the check valve is an integral part of the valve body.

11. A flow control valve system comprising a plurality of flow control modules arranged in line with one another, wherein each module is comprised of:

a) a valve body having a bore extending therethrough, wherein the bore has an area;

b) a first disc secured within the valve body, wherein the first disc i) occupies substantially the entire area of the bore and ii) has at least one aperture extending through the disc;

c) a second disc adjacent to the first disc within the valve body, wherein the second disc i) occupies substantially the entire area of the bore, ii) is rotatable within the valve body about a central shaft, iii) has at least one aperture extending through the second disc, and iv) is rotatable to align the apertures of each disc an amount necessary to control fluid flow; and d) a check valve within the valve body proximate to the first disc and second disc to close and prevent back flow.

12. The system in accordance with claim 11, wherein each valve has a body front end and a back end and the front end of one valve body has a configuration compatible with the configuration of the back end of another body so that the adjacent bodies may fit together in a prescribed orientation.

13. The system in accordance with claim 11, wherein the central shaft extends through the second disc of each module and further including a driver for rotating the central shaft and thereby each second disc to a desired rotational position.

14. The system in accordance with claim 13, wherein the driver is comprised of a gear arrangement.

15. The system according to claim 14, wherein the gear arrangement is a worm gear driver, which engages a driven gear, mounted upon the central shaft.

16. The system according to claim 14, wherein the gear arrangement is a separate module positioned in line with the valve bodies.

17. The system according to claim 13, further including a plurality of drivers, wherein each driver independently controls the second disc of one or more flow control module.

18. The system according to claim 13 wherein each flow control module is positioned in line to reduce pressure from the inlet to the outlet to provide a plurality of incremental pressure drops over the length of the flow control valve system.

19. A method of controlling flow within a pipeline having a flow area therein comprising the steps of:

a) installing a check valve within the pipeline;

b) installing a flow control valve module within the pipeline adjacent to the check valve, wherein the flow control valve module has two abutting disc with apertures extending therethrough and wherein each disc occupies substantially the entire flow area; and c) aligning the apertures of the first disc and the second disc to provide a flow through the disc within the range of maximum pressure drop, wherein the apertures are aligned by selectively rotating the second disc to provide a predetermined pressure drop across the discs over the range of rotation of the second disc.

20. The method according to claim 19 further including the step of arranging multiple flow control valves in line to provide incremental pressure drops for a total required pressure drop in stages to minimize or eliminate cavitation.

21. The method according to claim 19 wherein the flow control valve module is installed upstream of the check valve.

22. A method of controlling flow within a pipeline having a flow area therein comprising the steps of:

a) installing a check valve within the pipeline;

b) installing a flow control valve module within the pipeline adjacent to the check valve, wherein the flow control valve module has two abutting disc with apertures extending therethrough and wherein each disc occupies substantially the entire flow area;

c) aligning the apertures of the first disc and the second disc to provide a flow through the disc within the range of maximum pressure drop; and d) arranging multiple flow control valves in line to provide incremental pressure drops for a total required pressure drop in stages to minimize or eliminate cavitation.

23. A method of controlling flow within a pipeline having a flow area therein comprising the steps of:

a) installing a check valve within the pipeline;

b) installing a flow control valve module within the pipeline adjacent to the check valve, wherein the flow control valve module has two abutting disc with apertures extending therethrough and wherein each disc occupies substantially the entire flow area; and c) providing a predetermined pressure drop across the discs by aligning the apertures of the first disc and the second disc to provide a flow through the disc within the range of maximum pressure drop.

24. A flow control valve module comprised of:

a) a valve body having a bore extending therethrough, wherein the bore has an area;

b) a first disc secured within the valve body, wherein the first disc i) occupies substantially the entire area of the bore and ii) has at least one aperture extending through the disc;

c) a second disc adjacent to the first disc within the valve body, wherein the second disc i) occupies substantially the entire area of the bore, ii) is rotatable within the valve body about a central shaft, iii) has at least one aperture extending through the second disc, and iv) is rotatable to align the apertures of each disc an amount necessary to control fluid flow, and whereby the alignment always provides at least some fluid flow between the first disc and the second disc;

d) a check valve within the valve body proximate to the first disc and second disc to close and prevent back flow; and e) wherein the central shaft extends through the second disc and is engaged with the second disc and further includes a driver for rotating the central shaft and thereby second disc to a desired rotational position and wherein the driver is comprised of a gear arrangement.

25. A flow control valve module comprised of:

a) a valve body having a bore extending therethrough, wherein the bore has an area;

b) a first disc secured within the valve body, wherein the first disc i) occupies substantially the entire area of the bore and ii) has at least one aperture extending through the disc;

c) a second disc adjacent to the first disc within the valve body, wherein the second disc i) occupies substantially the entire area of the bore, ii) is rotatable within the valve body about a central shaft, iii) has at least one aperture extending through the second disc, and iv) is rotatable to align the apertures of each disc an amount necessary to control fluid flow, and whereby the alignment always provides at least some fluid flow between the first disc and the second disc;

d) a check valve within the valve body proximate to the first disc and second disc to close and prevent back flow; and e) wherein the apertures are shaped so that the area of the orifice passageway changes linearly as the second disc is rotated relative to the first disc.

26. A flow control valve module comprised of:

a) a valve body having a bore extending therethrough, wherein the bore has an area;

b) a first disc secured within the valve body, wherein the first disc i) occupies substantially the entire area of the bore and ii) has at least one aperture extending through the disc;

c) a second disc adjacent to the first disc within the valve body, wherein the second disc i) occupies substantially the entire area of the bore, ii) is rotatable within the valve body about a central shaft, iii) has at least one aperture extending through the second disc, and iv) is rotatable to align the apertures of each disc an amount necessary to control fluid flow, and whereby the alignment always provides at least some fluid flow between the first disc and the second disc, wherein the apertures are shaped so that the area of the orifice passageway changes in a linearly as the second disc is rotated relative to the first disc; and d) a check valve proximate to and in fluid communication with the first disc and second disc to close and prevent back flow, wherein the check valve is separate and apart from the discs and may be either upstream or downstream of the discs.

* * * * *

UNITED STATES PATENT AND TRADEMARK OFFICE

CERTIFICATE OF CORRECTION

PATENT NO. : 6,945,264 B1 Page 1 of 1
DATED : September 20, 2005
INVENTOR(S) : Denzel et al.

It is certified that error appears in the above-identified patent and that said Letters Patent is hereby corrected as shown below:

Column 4,
Line 1, "The gear ration" should read -- The gear ratio --.

Column 10,
Line 13, "changes in a linearly" should read -- changes linearly --.

Signed and Sealed this

Eleventh Day of April, 2006

JON W. DUDAS
*Director of the United States Patent and Trademark Office*